Patented Feb. 15, 1927.

1,617,847

UNITED STATES PATENT OFFICE.

FRITZ HEINZE, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

MANUFACTURE OF DIAMINO-DIARYL-UREA.

No Drawing. Application filed May 27, 1926, Serial No. 112,126, and in Germany June 10, 1925.

It is known to prepare p.p'-diamino-diphenyl-urea by reducing p.p'-dinitro-carbanilide by means of tin and hydrochloric acid or by melting urea with mono-acetyl-p-phenylene-diamine and saponifying the resulting di-acetyl compound.

I have now found that urea reacts also with non acetylated p-phenylene-diamine with the formation of p.p'-diamino-diphenyl-urea. Preferably the reaction is carried out at an elevated temperature and in the presence of an inert diluent. Instead of p-phenylene-diamine its derivatives substituted in the nucleus may also be employed.

The following examples will further illustrate how my present invention may be carried out in practice, but the invention is not limited to these examples. The parts are by weight.

Example 1.

A mixture of 60 parts of urea, 216 parts of p-phenylene-diamine and 600 parts of o-dichlor-benzene is slowly heated to 130° C. When the evolution of ammonia is finished, the o-dichlor-benzene is distilled off by means of steam; the residue is dissolved in dilute hydrochloric acid and the solution is filtered. p.p'-diamino-diphenyl-urea is obtained therefrom with a good yield by precipitation by means of sodium carbonate.

Example 2.

A mixture of 60 parts of urea, 262 parts of 2.5-toluylene-diamine and 600 parts of trichlor-benzene is heated to 125° to 130°, until the evolution of ammonia is finished. The trichlor-benzene is distilled off by means of steam and the residue is worked up in the manner described in Example 1. 4.4'-diamino-3.3'-dimethyl-diphenyl-urea is obtained with a good yield.

Example 3.

576 parts of p-phenylene-diamine are intimately mixed with 160 parts of urea and heated to 110° to 120° C. in a vessel standing in a hot air bath. After the evolution of ammonia is finished, the product is dissolved in dilute hydrochloric acid and filtered. From the filtrate p.p'-diamino-diphenyl-urea is precipitated by means of sodium carbonate.

I claim:

1. The process of preparing diamino-diphenyl-ureas which consists in acting on a p-phenylene-diamine with urea.

2. The process of preparing diamino-diphenyl-ureas which consists in heating a p-phenylene-diamine with urea.

3. The process of preparing diamino-diphenyl-ureas which consists in heating a p-phenylene-diamine with urea in the presence of an inert diluent.

In testimony whereof I have hereunto set my hand.

FRITZ HEINZE.